Jan. 17, 1967 E. T. MOORE ETAL 3,299,279

TURN-OFF CIRCUITRY FOR SILICON CONTROLLED RECTIFIER AND OTHER THYRATRON-LIKE DEVICES

Filed Dec. 31, 1962 3 Sheets-Sheet 1

*INVENTORS*
EDWARD T. MOORE
THOMAS G. WILSON
BY B. B. Olive
ATTORNEY

INVENTORS
EDWARD T. MOORE
THOMAS G. WILSON
BY B. B. Oliver
ATTORNEY

INVENTORS
EDWARD T. MOORE
THOMAS G. WILSON
BY
B. B. Oliver
ATTORNEY

United States Patent Office 3,299,279

Patented Jan. 17, 1967

3,299,279

TURN-OFF CIRCUITRY FOR SILICON CONTROLLED RECTIFIER AND OTHER THYRATRON-LIKE DEVICES

Edward T. Moore, 190 Withers Road, Wytheville, Va. 24382, and Thomas G. Wilson, 2721 Sevier St., Durham, N.C. 27705

Filed Dec. 31, 1962, Ser. No. 249,110
42 Claims. (Cl. 307—88)

The invention described herein was made in the performance of work under a NASA contract and is subject to the provisions of the National Aeronautics and Space Act of 1958, Public Law 85-568 (72 Stat. 426; 42 U.S.C. 2451), as amended.

This invention is concerned with circuitry suitable for use with silicon controlled rectifiers and other thyratron-like devices, and in particular concerns the use of a multi-core saturable transformer to control the period of conduction of such devices.

A silicon controlled rectifier is a three-terminal PNPN semi-conductor device which is commercialy available and which is widely used as a static switching element. Application of a positive gate-cathode current pulse to the silicon controlled rectifier allows the device to exhibit a low impedance to forward current through the anode-cathode current path. The silicon controlled rectifier is analogous to the grid controlled gaseous thyratron in being a unidirectional conducting device having a control gate element and in that after it has been rendered conductive it remains in the conductive state until the forward current is reduced below the predetermined critical value necessary to return the device to its current blocking condition. The silicon controlled rectifier regains its forward blocking ability most quickly if a reverse voltage is impressed across the anode-cathode terminals during the turn-off interval. Many applications for the silicon controlled rectifier and other thyratron type devices are found in amplifiers, gating circuits, inverters and the like and in these various applications there is the common circuit problem of periodically turning off and restoring the forward blocking ability of the particular device employed. It is to this aspect of the operation of silicon controlled rectifiers, thyratron gas tubes, and like control devices that the invention is primarily concerned.

A general object of the invention is to provide improved circuits for turning off thyratron-like devices as exemplified by the silicon controller rectifier and thyratron gas tube.

A more specific object of the invention is to provide an improved circuit for turning off such a type device, which circuit employs only passive elements in the circuit outside the device itself.

Another object of the invention is to provide an improved circuit for such a type device which provides during the conduction interval a load voltage proportional to the source voltage followed by an appropriately appearing turn-off voltage useful for turning off the device and thereby bringing the load voltage abruptly to zero.

Another object is to provide an improved circuit for turning off such a type device in which the circuit elements may be of relatively low weight so as to make the circuit adaptable to aircraft and space applications.

Another general object is to provide an improved circuit for turning off such a type device which is of exceptionally high reliability.

Other objects and advantages of the invention will become apparent from the following description and accompanying drawings wherein like elements are identified by the same reference characters, and in which.

Figure 1:
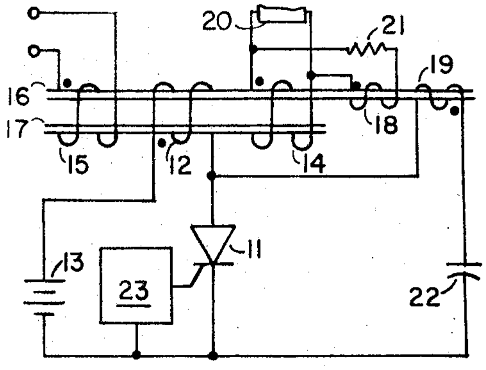
FIGURE 1 is a circuit diagram of a circuit using a silicon controlled rectifier in accordance with the invention.

The embodiment of the invention shown in FIGURE 1 of the drawings includes a silicon controlled rectifier 11. This controlled rectifier is connected in series with a primary winding 12 and a source of D.C. voltage 13. Primary winding 12 along with a load winding 14 and a reset winding 15 encircles the two cores 16 and 17. The core 16 is encircled by two other windings, 18 and 19, which do not encircle core 17. The load 20 is connected in parallel with winding 14 as in the series combination of the resistor 21 and winding 18. One end of winding 19 is connected to the anode of the controlled rectifier 11 and the other end of this winding is connected through a capacitor 22 to the cathode of the controlled rectifier. It is essential to the operation of this circuit that winding 12 must contain a greater number of turns than are contained in winding 19. The controlled rectifier 11 is gated by a suitable trigger circuit and since the type of trigger circuit employed has no particular bearing on the present invention, a trigger circuit 23 is represented in block diagram form without further discussion.

Figure 2:
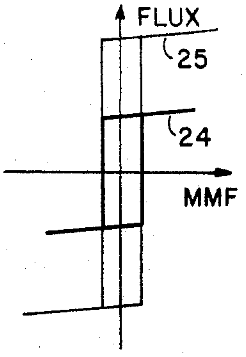
FIGURE 2 is a diagram of forms of hysteresis-loop characteristics suitable for the two cores employed in the circuit of FIGURE 1.

In FIGURE 2 are shown the magnetic characteristics of the two cores 16 and 17. Core 17 is the main power-handling core and has a saturation flux level significantly greater than that of core 16, the latter core being selected to be of relatively small area. Both cores in this embodiment preferably exhibit a highly square hysteresis loop, the loop of core 16 being represented at 24 and the loop of core 17 being represented at 25. Two adjacent flux paths of different saturating characteristics are thus established. Torodal square-loop cores have been found to be ideally suited to the invention and since, as later explained, core 16 is active only when the controlled rectifier 11 is being turned off, core 16 can be very small in size relative to core 17. The exact choice of core material and core construction will vary with the application since the material and cross-sectional area of the cores contribute to determining the length of the conducting interval.

The circuit of FIGURE 1 operates in the following manner to allow the controlled rectifier 11 to conduct for a predetermined time interval and then by action of the nonlinear transformer elements to turn off the controlled rectifier. Assume that at the moment the controlled rectifier 11 is turned on by a positive gate pulse from the trigger circuit 23 neither of the transformer cores 16 or 17 is saturated and capacitor 22 is charged to the voltage of source 13. Turning on the controlled rectifier 11 causes the voltage of the source 13 to be impressed across winding 12 and any voltage on capacitor 22 to be impressed across winding 19. Core 16 is selected to have a very small area as previously mentioned and this core quickly saturates in one direction, which will be called the negative direction, and allows capacitor 22 to discharge through winding 19 and the now conducting controlled rectifier 11 until the voltage across capacitor 22 becomes equal to the low forward voltage drop of the conducting silicon controlled rectifier 11. As soon as the voltage across the capacitor 22 becomes equal to the voltage appearing across the conducting controlled rectifier 11 the current in winding 19 becomes zero. Consider now the net magnetomotive force (M.M.F.) applied to each of the square-loop cores 16 and 17. Current flowing in winding 18 will apply an M.M.F. only to core 16. The direction of the current flowing in winding 18 is determined by the polarity of the voltage in winding 14, and the direction of this current is always such that the resulting M.M.F. applied to core 16 by winding 18 opposes the net M.M.F. resulting from the currents in windings 12 and 14. If the resistance of resistor 21 is of a proper value, a small resetting voltage will be applied to winding 18; i.e., by proper choice of resistor 21, the flux in core 16 may be caused to move slightly in a direction opposite to the direction of the larger flux movement simultaneously occurring in core 17. By this means, the flux in core 16, which has been left saturated in the negative direction by the discharge of capacitor 22, is slightly reset in the opposite direction during the remainder of the conducting interval of the silicon controlled rectifier. As will be seen from the following discussion, it is necessary that, at the moment core 17 saturates in the negative direction, core 16 is not already saturated in this same direction.

Figure 3:
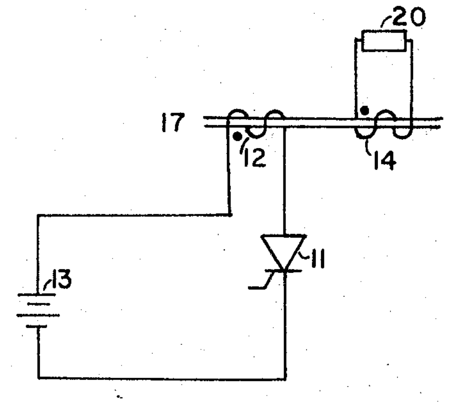
FIGURE 3 is a circuit diagram representing the equivalent circuit of FIGURE 1 during the conduction interval.
Figure 4:
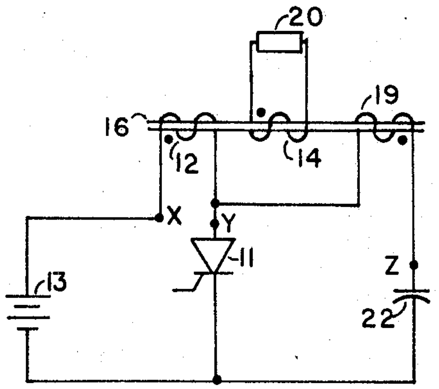
FIGURE 4 is a circuit diagram representing the equivalent circuit of FIGURE 1 during the non-conduction interval.

FIGURES 3 and 4 are equivalent circuits representing the circuit of FIGURE 1 during different parts of the cycle. The current flowing through resistor 21 of FIGURE 1 is assumed to be negligible compared to the current flowing in the load 20 and therefore is omitted from consideration in either equivalent circuit. The circuit of FIGURE 3 is the equivalent circuit of the circuit of FIGURE 1 during the interval between the moment the controlled rectifier is turned on and the moment at which, as a result of the voltage of the D.C. source 13 being impressed across winding 12, core 17 becomes saturated. During this interval the constantly changing flux within core 17 allows the source voltage to be supported across winding 12 and a voltage is induced in the load winding 14. Therefore, so long as core 17 remains unsaturated, power is delivered to the load 20. At the moment core 17 saturates, core 16 abruptly becomes the effective core and the equivalent circuit becomes that of FIGURE 4. When this occurs, a reverse voltage is momentarily impressed across the silicon controlled rectifier 11 and the rectifier regains its current-blocking ability.

That the saturation of core 17 ends the conduction interval by causing the controlled rectifier 11 to be turned off may be seen by considering the conditions which exist immediately after core 17 saturates. After core 17 becomes saturated, any further change in flux within winding 12 must occur in core 16. But at this moment winding 19 suddenly assumes an active role in the circuit. To facilitate the explanation of the turning off of the controlled rectifier, the following definitions will be made. Define N12 and N19 respectively as the number of turns in windings 12 and 19. Define E as the voltage of the D.C. source 13. It has previously been stated that the turns ratio $N12:N19$ must be greater than unity. Consider the potential appearing at points X, Y and Z in the equivalent circuit, FIGURE 4, representing the circuit of FIGURE 1 immediately after core 16 becomes the effective core. Point Z is almost at zero potential since the voltage across capacitor 22 was fixed by the low forward drop of the controlled rectifier as it conducted. The heavy dots represent those ends of the windings which are simultaneously positive. Point X is at a potential of E volts corresponding to the voltage of the direct-current source 13. The potential at point Y, i.e. at the anode of the controlled rectifier 11 becomes negative at this moment as will be seen by considering the following voltage relations. The voltage difference of approximately E volts between points X and Z is impressed across windings 12 and 19 in series or across an effective total of $(N12-N19)$ turns. The voltage at point Y is equal to the voltage at point X less the voltage induced in winding 12, and the voltage at point Y may therefore be expressed as $E-EN12/(N12-N19)$. Since $N12/(N12-N19)$ is greater than unity, the voltage at Y is negative, and the anode of the controlled rectifier 11 is therefore negative with respect to its cathode at this moment. The length of time that a reverse voltage is maintained across the controlled rectifier 11 is determined by how quickly the voltage across capacitor 22 changes after core 17 has saturated. Thus, the capacitance of capacitor 22 and the magnitude of the load current as reflected into the windings 12 and 19 in series will determine the time interval of the reverse voltage. Since it is only necessary that the reverse voltage be maintained for the few microseconds required to enable the controlled rectifier 11 to regain its forward blocking ability, capacitor 22 need not be large.

After the controlled rectifier 11 of the circuit of FIGURE 1 has been turned off, capacitor 22 with charge to a voltage corresponding to that of the source 13 and all currents within the circuit will become zero. Core 17 will be left saturated in what will be called the negative direction. Before another gating pulse is applied to the controlled rectifier 11 to turn it on, a voltage of proper polarity is applied to the reset winding 15 in order to reset the flux in core 17 toward its opposite saturation level, called positive saturation. The polarity of the reset voltage is such that the dotted end of winding 15 is made negative with respect to the undotted end. It is also possible to provide the necessary resetting through a reset winding which encircles only core 17. The means by which a reset voltage is provided may vary according to practices well known in the art and since this reset source is not, per se, a part of this invention the same will not be discussed in further detail.

In FIGURE 1, the series circuit of resistor 21 and winding 18 is shown to be connected in parallel with the load winding 14. And as explained in the preceding discussion, a portion of the voltage derived from the load winding 14 during the conducting interval is applied to winding 18 in order to establish special conditions of relative flux movement within the two cores 16 and 17. Persons skilled in the art will recognize that the voltage for winding 18 may be derived by several alternate but equivalent connections; as for example, by connecting the dotted end of winding 18 to the undotted end of winding 12 and connecting the undotted end of 18 through resistor 21 to the dotted end of 12. It is also possible to connect winding 18 and resistor 21 across only a portion of, for example, winding 14. Persons skilled in the art will also recognize that, although in FIGURE 2 both cores are shown to require the same magnetizing M.M.F., this is not a necessary condition for the operation of the circuit of FIGURE 1. The cores may, in fact, exhibit quite different hysteresis loop widths and still function as previously described.

Figure 5:
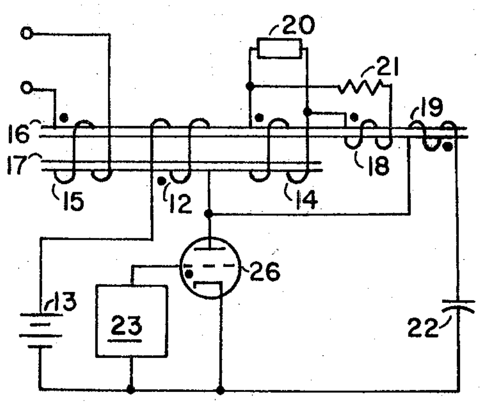
FIGURE 5 is a circuit diagram of a circuit using a thyratron gas tube in accordance with the invention.

In FIGURE 5 is shown the same embodiment of the invention as shown in FIGURE 1 except that a grid-controlled gaseous thyratron tube 26 has been substituted for the silicon controlled rectifier 11 of FIGURE 1. After a pulse from the trigger circuit 23 initiates conduction, the thyratron tube 26 of FIGURE 5 will be allowed to conduct until core 17 saturates, at which time it will be turned off in the same manner as was the silicon controlled rectifier 11 of the circuit of FIGURE 1.

Figure 7:
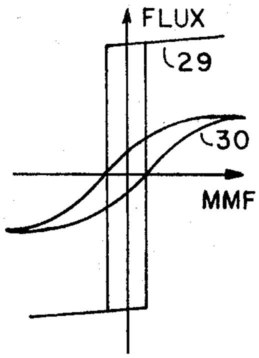
FIGURE 7 is a diagram of forms of hysteresis-loop characteristics suitable for the two cores employed in the circuit of FIGURE 6.
Figure 6:
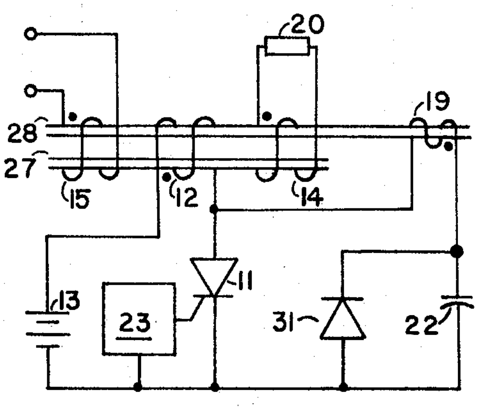
FIGURE 6 is a circuit diagram of a circuit using a silicon controlled rectifier in accordance with an alternative embodiment of the invention.

Another embodiment of the invention is shown in FIGURE 6. Note that in this circuit there is no winding corresponding to winding 18 of the circuit of FIGURE 1. The elimination of this winding is made possible in the circuit of FIGURE 6 by the utilization of a square-loop core 27 combined with a more linear, low remenance core 28. FIGURE 7 shows the magnetic characteristics of the two cores of the circuit of FIGURE 6, the loop of core 27 being indicated at 29 and the loop of core 28 being indicated at 30. Aside from the elimination of winding 18 and resistor 21, the configuration of the circuit of FIGURE 6 is identical to that of FIGURE 1 and corresponding components in the two circuits have been given the same numbers. In the circuit of FIGURE 1, turning on the controlled rectifier 11 causes any voltage appearing on capacitor 22 to be impressed across winding 19 with the possible result that after the discharge of the capacitor 22, core 16 may be left in a state of negative saturation. If core 16 were allowed to remain in this saturated condition until core 17 also saturated, both cores would then be saturated in the negative direction and the controlled rectifier would fail to be turned off. In the circuit of FIGURE 1 this condition is avoided because a voltage is applied to winding 18 such that the flux in core 16 is moved away from negative saturation before core 17 reaches negative saturation. In the circuit of FIGURE 6, this condition is avoided by using a low remanence core 28 for core 16 of FIGURE 1, therefore insuring that after capacitor 22 discharges, the flux in core 28 will return to a level significantly below the saturation level. In certain applications a diode 31 connected as shown in FIGURE 6 may be employed to prevent capacitor 22 from becoming charged with its upper plate negative. In other respects, the operation of the circuit of FIGURE 6 is the same as that described for the circuit of FIGURE 1.

Thus far two means of establishing the required conditions of relative flux movement within the two cores have been described; one involving the use of two square-loop cores and the other involving the use of one square-loop core and one core having low remenance characteristics. Consideration is now given to another means of satisfying these conditions with the use of two square-loop cores. Refer to the circuit of FIGURE 11. This circuit is the same as the circuit of FIGURE 1 except that resistor 21 and winding 18 have been eliminated and inductor 41 and diode 42 have been added. In both circuits each of the cores have square-loop characteristics. In the circuit of FIGURE 1, turning on the silicon controlled rectifier 11 causes the voltage on capacitor 22 to be impressed across winding 19 thus causing core 16 to quickly saturate and allow the discharge of capacitor 22. Then the voltage appearing on winding 18 acts to reset core 16 so that it is again unsaturated at the moment core 17 becomes saturated. Attention is now given to an equivalent sequence of events which takes place in the circuit of FIGURE 11.

Figure 11:
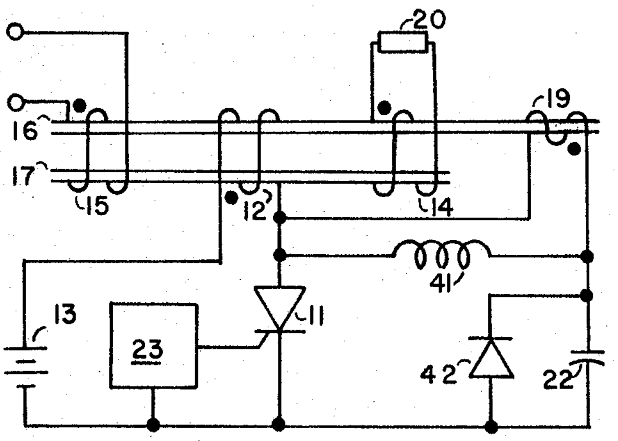
FIGURE 11 is a circuit diagram of a circuit using a silicon controlled rectifier in accordance with a still further alternative embodiment of the invention.

In the circuit of FIGURE 11, turning on silicon controlled rectifier 11 causes the voltage on capacitor 22 to be impressed across both winding 19 and inductor 41. After a brief interval, core 16 saturates and allows capacitor 22 to discharge. However, until the moment the voltage on capacitor 22 actually becomes equal to the forward voltage drop of the silicon controlled rectifier, energy is being stored in the inductor 41. After the discharge of capacitor 22 is completed this inductively stored energy is returned to the circuit and has the effect of causing a current to flow through winding 19 in such a direction as to accomplish the desired resetting of core 16. The purpose of diode 42, like diode 31 in FIGURE 6, is to prevent capacitor 22 from becoming charged negatively as inductor 41 releases its stored energy. Thus, inductor 41 and diode 42 as shown in FIGURE 11 may be used to perform the same function as winding 18 and resistor 21 of the circuit of FIGURE 1. In either case, two square-loop cores may be employed.

Figure 8:
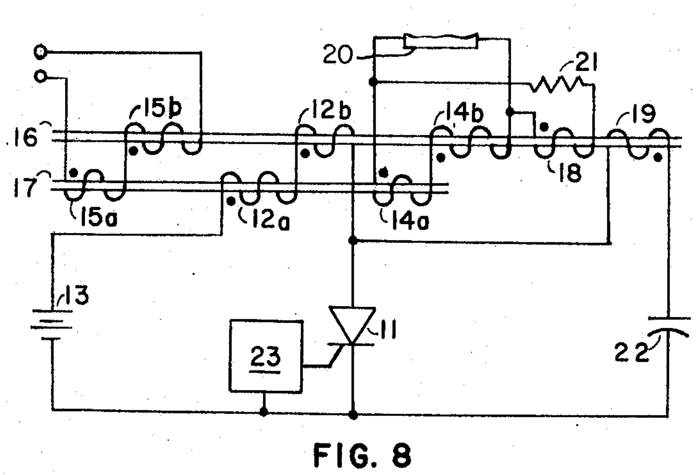
FIGURE 8 is a circuit diagram of a circuit using a silicon controlled rectifier in accordance with a further alternative embodiment of the invention.

In the embodiment of FIGURE 1, windings 12, 14 and 15 encircle both of the cores of the two-core transformer. Thus, current flowing in any of these three windings causes an M.M.F. to be applied to both of the cores, and a flux change in either of the two cores causes an E.M.F. to be induced in these windings. These same conditions may also be satisfied without the necessity for having windings which encircle both cores. For example, compare the embodiment of the invention shown in FIGURE 8 to that shown in FIGURE 1. In FIGURE 8, two windings, **12*a* encircling only core 17 and 12*b* encircling only core 16, replace winding 12 of the circuit of FIGURE 1, which encircles both cores. In FIGURE 8 current flowing through the series circuit of windings 12*a* and 12*b* applies an M.M.F. to both cores, In FIGURE 1 current flowing through winding 12 applies an M.M.F. of both cores. In FIGURE 8, flux movement in either core 16 or 17 will induce an E.M.F. in the series circuit of windings 12*a* and 12*b*. Correspondingly, in FIGURE 1, flux movement in either core 16 or 17 will induce an E.M.F. in winding 12. In a similar manner it may be seen that winding 14 in FIGURE 1 may be replaced by two windings 14*a* and 14*b* as shown in FIGURE 8, and that winding 15 in FIGURE 1 may be replaced by two windings 15*a* and 15*b* as shown in FIGURE 8. If the number of turns in winding 12*a* is equal to the number of turns in winding 12*b*, the number of turns in 14*a* equal to the number of turns in 14*b*, and the number of turns in 15*a* equal to the number of turns in 15*b*, the circuit of FIGURE 8 is electrically equivalent to the circuit of FIGURE 1. Thus, the functioning of the two embodiments of the invention is identical although they differ slightly in physical configuration. If should be noted that it is not essential to the functioning of the embodiment of FIGURE 8, that the number of turns in windings 12*a* and 12*b*, or 14*a* and 14*b*, or 15*a* and 15*b* be equal. However, it is desirable that the ratio of the number of turns in winding 12*a* to the number of turns in winding 12*b* be equal to the ratio of the number of turns in winding 14*a* to the number of turns in winding 14*b*. The number of turns in winding 19 must be less than the number of turns in winding 12*b***.

Each of the embodiments of the invention herein described may be used as a means of controlling the time-interval during which energy from the source is applied to a load. In each of the embodiments which have been discussed, this energy transfer is accomplished by transformer action and the energy is applied to the load through a secondary winding on the two-core transformer. Persons skilled in the art will readily recognize that various alternate means for providing energy to a loading device may readily be employed. As one example, consider an alternate connection for the load 20 of the circuit shown in FIGURE 1. In the embodiment of the invention shown in FIGURE 1, energy is supplied to the load 20 through a secondary winding 14. An alternate connection for the load would be to simply connect the load in parallel with the primary winding 12. It should also be pointed out that the invention may also possess utility in applications in which supplying and controlling power to a loading device may not be the objective at all. For example, the invention is suited for use in what is commonly called a ring counter or in applications in which it is desired to use a silicon controlled rectifier as a switching element to control the transmission of information.

Figure 9:
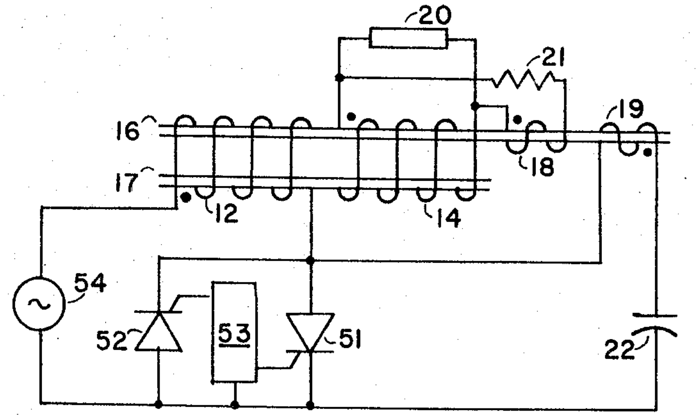
FIGURE 9 is a circuit diagram of a circuit using a pair of silicon controlled rectifiers and alternating voltage source in accordance with a still further embodiment of the invention.
Figure 10:
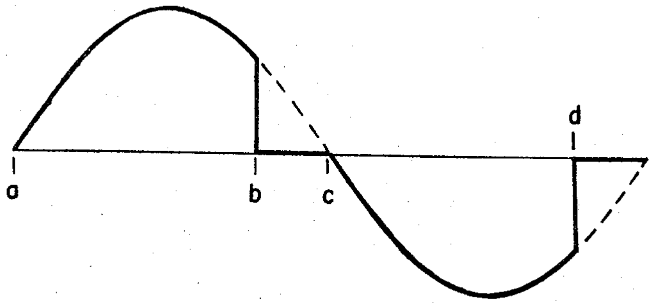
FIGURE 10 is a diagram illustrating the output waveform of the circuit of FIGURE 9.

Although a D.C. voltage source has been assumed for the discussion of the foregoing embodiments of the invention this should not be interpreted as indicating that the use of the invention is limited to D.C. applications. For example, in using a silicon controlled rectifier in an A.C. circuit it may be desired that means be available to turn off the silicon controlled rectifier prior to, and without dependence upon, the natural reversal of current which occurs each half cycle as a result of the periodic reversal in polarity of the A.C. voltage source. FIGURE 9 illustrates one specific manner of using the invention with an A.C. source. During each half cycle, the operation of this circuit is quite analogous to the previously explained operation of the circuit of FIGURE 1. However, in the circuit of FIGURE 9 the source 54 is a source of alternating voltage and, in this circuit, two silicon controlled rectifiers 51 and 52 are used. These controlled rectifiers are connected in series with the primary winding 12 in such a manner that during one-half cycle of the source voltage silicon controlled rectifier 51 experiences a forward voltage and during the other half cycle silicon controlled rectifier 52 experiences a forward voltage. Assume, for example, that the waveform of the A.C. voltage supplied by source 54 is sinusoidal. Refer to FIGURE 10 which compares the idealized output of the circuit of FIGURE 9 to a sine wave. Assume that at point "*a*" in the cycle a voltage from the triggering source 53 turns on controlled rectifier 51. This controlled rectifier will then conduct until the moment core 17 saturates, at which time, indicated in FIGURE 10 as point "*b*," it will be turned off in the same manner as was the controlled rectifier of the circuit of FIGURE 1. The controlled rectifier 51 conducts during the interval from "*a*" to "*b*," and during this interval the output voltage will be proportional to the source voltage and, thus, will be sinusoidal in form as indicated in FIGURE 10. At point "*b*" the controlled rectifier 51 is turned off and the output voltage drops to zero for the remainder of the half cycle. At point "*c*," a voltage from the triggering source 53 turns on silicon controlled rectifier 52 and the resulting flux movement in core 17 is in a direction opposite to that which occurred during the preceding half cycle. At point "*d*," core 17 again saturates, the controlled rectifier 52 is turned off, and the output voltage drops to zero for the remainder of the half cycle. Note that, because the functions of this circuit during each half cycle are complementary, and in particular because, by the natural operation of the circuit, core 17 is cycled between positive and negative saturation, no provisions are necessary to provide for resetting the flux in core 17 after each half cycle. Thus the circuit of FIGURE 9 contains no winding which might be compared to winding 15 of FIGURE 1.

Examination of the various embodiments which have been discussed makes clear the fact that the basic element of this invention is a two-core transformer in which the nonlinearities of appropriate magnetic materials along with certain winding configurations are used to establish a time sequence governing the order in which the two cores of the transformer experience a flux change. More specifically, an interval is provided during which the silicon controlled rectifier conducts and the majority of the flux change occurs only in the first core. This conducting interval is followed by a brief turn-off interval during which only the flux in the second core changes. During this turn-off interval certain transient conditions exist within the circuit such that the silicon controlled rectifier is returned to the non-conducting state. The transition from the conducting interval to the turn-off interval is characterized by an abrupt cessation of flux change in the first core along with a simultaneous institution of considerable flux change in the second core. A winding encircling only the second core, therefore, experiences very little induced voltage during the conducting interval, but will, during the brief turn-off interval, experience a considerable induced voltage. This characteristic is utilized in the invention by connecting such a winding to the silicon controlled rectifier in such a manner that the suddenly appearing E.M.F. in this winding places a reverse voltage across the silicon controlled rectifier thus returning it to the non-conducting state.

After the turn-off transient has occurred, the controlled rectifier remains non-conducting until such time as it is again turned on by a properly applied gate-cathode voltage derived from the triggering source. In the invention, the transition from the conducting interval, the interval during which the flux in the first core is changing and the silicon controlled rectifier is conducting, to the turn-off interval, during which the majority of the flux change occurs in second core, is caused by the saturation of the first core. Thus it is normally desired that the first core exhibits a highly "square" hysteresis loop so as to make the transition from an unsaturated to a saturated condition as abrupt as possible. As becomes evident in the several embodiments, various simple means exist for establishing conditions within the transformer such that the saturation of the first core does in fact cause the flux in the second core to abruptly begin changing.

Thus, the invention uses the characteristics of a two-core transformer to control the length of the conducting interval of a silicon controlled rectifier or other thyratron-like device. As pointed out previously, provisions are readily made to allow this turning on and off of the controlled rectifier to control the delivery of electricl energy to a loading device. In the claims to follow, the term "load circuit" is intended to refer to any circuit dependent on the principal circuit of the invention for its operation. By this definition, a "load circuit" may be either a power-consuming circuit or a non-power consuming circuit. Also pointed out in the foregoing discussion is the fact that this invention may be used with either direct or alternating voltage sources.

Having described our invention, what we claim is:

1. In an electrical system, a controlled unidirectional conducting device having a control gate electrode; a source of voltage; a triggering source for said gating electrode operative to render said device conducting; a load circuit energized when said device is conducting; magnetic core means establishing first and second magnetic paths of predetermined hysteresis-loop characteristics; first winding means energized by said voltage source when said device is conducting and operative to apply magneto-motive forces of predetermined values to each of said paths whereby to effect a flux change predominantly in the first path followed by a flux change in the same direction predominantly in the second path; second winding means encircling only said second path; a capacitor connected in a series circuit with said second winding means and said circuit forming a shunt path around said device, said capacitor and second winding means being arranged and operative to apply a negative turn-off voltage across said device when under the influence of said second-path flux change, and said capacitor being operative to block flow of current in said shunt path when said device is non-conducting.

2. In an electrical system as claimed in claim 1 in which said source of voltage comprises a D.C. voltage source.

3. In an electrical system as claimed in claim 1 in which said source of voltage comprises an A.C. voltage source; in which a second controlled unidirectional conducting device is connected in parallel with the first controlled unidirection conducting device of claim 1 so that the anode of the second is connected to the cathode of the first and the cathode of the second to the anode of the first; in which said triggering source is operative for the gating electrode of the second device in addition to the first device to render the first of said devices conducting during one-half cycle and the second of said devices conducting during the alternate half cycle of said A.C. voltage source and thereby cause the two said devices to perform complementary functions on alternate half cycles; and in which said load circuit is energized when either of said devices is conducting.

4. In an electrical system as claimed in claim 1 in which said device comprises a solid state device.

5. In an electrical system as claimed in claim 1 in which said device comprises a silicon controlled rectifier.

6. In an electrical system as claimed in claim 1 in which said device comprises a thyratron gas tube.

7. In an electrical system as claimed in claim 1 in which said hysteresis-loop characteristics are primarily of a square-loop nature.

8. In an electrical system as claimed in claim 1 including a winding encircling only said second path and arranged to be energized during said first path flux change and so connected to cause said second path to be magnetized at such time in the opposite direction as said first path.

9. In an electrical system as claimed in claim 1 in which said first winding means includes a winding encircling both of said paths.

10. In an electrical system as claimed in claim 1 in which said first winding means includes a pair of windings in series and with each member of the pair encircling only one of said paths.

11. In an electrical system as claimed in claim 1 including as inductor connected in parallel with said second winding means and operative to store and return energy at predetermined times whereby to cause said second path to be magnetized in the opposite direction as said first path during a portion of the conducting interval of said device.

12. In an electrical system as claimed in claim 1 including a diode rectifier connected in parallel with said capacitor to prevent said capacitor from ever becoming charged negatively.

13. In an electrical system as claimed in claim 1 in which said hysteresis-loop characteristics comprise a square-loop characteristic for said first path and a low-remanence characteristic for said second path.

14. In an electrical system as claimed in claim 1 wherein said load circuit includes a load winding encircling both of said paths.

15. In an electrical system as claimed in claim 1 including reset winding means operative when said device is non-conducting to reset at least said first path in a direction of magnetization opposite to the direction of magnetization when said device is conducting.

16. In an electrical system, a controlled unidirectional conducting device having a gating electrode; a source of voltage; a triggering source for said gating electrode operative to render said device conducting; a load circuit; magnetic core means establishing first and second saturable magnetic paths characterized by the first being saturable prior to the second when subjected to the same coercive force; a primary winding encircling both of said paths and a secondary winding encircling only said second path; means connecting said windings in said system to said device and source of voltage such that when said device is made conducting by said trigger source, said primary winding acts to cause a flux change predominantly in said first path followed by a flux change predominantly in said second path and said secondary winding acts during said last flux change to apply a reverse voltage to said device and terminate said conducting; and a capacitor in series with and operative to block flow of current through said secondary winding when said device is not conducting.

17. In an electrical system as claimed in claim 16 in which said source of voltage comprises a D.C. voltage source.

18. In an electrical system as claimed in claim 16 in which said source of voltage comprises an A.C. voltage source; in which a second controlled unidirectional conducting device is connected in parallel with the first controlled unidirectional conducting device of claim 16 so that the anode of the second is connected to the cathode of the first and the cathode of the second to the anode of the first; in which said triggering source is operative for the gating electrode of the second device in addition to the first device to render the first of said devices conducting during one-half cycle and the second of said devices conducting during the alternate half cycle of said A.C. voltage source and thereby cause the two said devices to perform complementary functions on alternate half cycles; and in which said load circuit is energized when either of said devices is conducting.

19. In an electrical system as claimed in claim 16 wherein said device comprises a solid state device.

20. In an electrical system as claimed in claim 16 wherein said device comprises a silicon controlled rectifier.

21. In an electrical system as claimed in claim 16 wherein said device comprises a thyratron-type device.

22. In an electrical system as claimed in claim 16 wherein both of said paths have square-loop characteristics.

23. In an electrical system as claimed in claim 16 including a winding encircling only said second path and operative when said device is conducting to cause said second path to be magnetized at such time in a direction opposite to the direction in which said first path is magnetized.

24. In an electrical system as claimed in claim 16 in which the hysteresis-loop characteristics of said paths comprise a square-loop characteristic for said first path and a low-remanence characteristic for said second path.

25. In an electrical system as claimed in claim 16 wherein said load circuit includes a winding encircling both of said paths.

26. In an electrical system as claimed in claim 16 including a reset winding operative when said device is not conducting to reset at least said first path in a direction of magnetization opposite to the direction of magnetization when said device is conducting.

27. In an electrical system as claimed in claim 16 including an inductor connected in parallel with said secondary winding and operative to store and return energy at predetermined times whereby to cause said second path to be magnetized in the opposite direction as said first path during a portion of the conducting interval of said device.

28. In an electrical system, a controlled rectifier device having cathode, anode, and gating electrodes; a source of unidirectional voltage; first and second saturable magnetic core means, said first core means having a substantially square hysteresis loop; a primary winding encircling both of said core means, said source and said device and said primary winding being in series; a secondary winding encircling only said second core means; a capacitor connected in series with said secondary winding, said capacitor and secondary winding being connected in a series circuit and such circuit being in parallel with the anode-cathode path of said device; an auxiliary winding encircling only said second core means and operative to apply an auxiliary magnetomotive force to said second core means when said device is conducting, said auxiliary magnetomotive force being of such direction as to oppose the magnetomotive force produced by current flowing in said primary winding; a load circuit connected in said system, said load circuit being energized when said device is conducting; a triggering source operative to render said controlled rectifier conducting by the application of a signal to the gate electrode of said controlled rectifier, said conducting being effective to allow current to flow through said primary winding and said controlled rectifier and to cause the voltage of said source to be impressed across said primary winding and to allow the discharge of said capacitor to a low voltage through said controlled rectifier and secondary winding, energization of said primary winding causing a flux change occurring predominantly in said first core means until the flux level in the first core means reaches the saturation level herein called positive saturation, followed by a flux change occurring predominantly in said second core means, said last flux change serving to induce a voltage in said secondary winding, said last voltage appearing as a transient across said controlled rectifier and having such polarity as to make the cathode of said controlled rectifier momentarily positive with respect to the anode of said controlled rectifier thereby interrupting the flow of forward current through said controlled rectifier and returning said controlled rectifier to the non-conducting state; and reset winding means encircling at least said first core means whereby the flux in said first core means may be reset toward the negative saturation level during the interval the device is non-conducting.

29. In an electrical system as claimed in claim 28 wherein the load circuit consists of a load device energized during the conducting interval of the controlled rectifier through a load winding encircling both of said magnetic core means.

30. In an electrical system as claimed in claim 28 wherein said reset winding encircles both of said core means.

31. In an electrical system as claimed in claim 28 wherein said primary winding consists of a single winding whose turns encircle both of said magnetic core means.

32. In an electrical system as claimed in claim 28 wherein said primary winding consists of a pair of windings in series, with the turns of each member of the pair encircling only one of said core means.

33. In an electrical system as claimed in claim 28 wherein said second saturable magnetic core means is of low remanence characteristic.

34. In an electrical system as claimed in claim 28 in which said second core means is of square-loop characteristic.

35. In an electrical system as claimed in claim 28 including an inductor connected in parallel with said secondary winding and operative to store and return energy at predetermined times whereby to cause said second core means to be magnetized in the opposite direction as said first core means during a portion of the conducting interval of said device.

36. In an electrical system as claimed in claim 28 including a diode rectifier connected in parallel with said capacitor to prevent said capacitor from ever becoming charged negatively.

37. In an electrical system, two controlled rectifiers having cathode, anode and gating electrodes, said controlled rectifiers being connected in parallel such that the anode of the first is connected to the cathode of the second and the cathode of the second is connected to the anode of the first; a source of alternating voltage; first and second saturable magnetic core means, said first core means having a substantially square hysteresis loop; a primary winding encircling both of said core means, said alternating voltage source and said parallel combination of said controlled rectifiers being in series with said primary winding; a secondary winding encircling only said second core means; a capacitor connected in series with said secondary winding, said capacitor and secondary winding being connected in a series circuit and such circuit being in parallel with the anode-cathode path of said controlled rectifiers; an auxiliary winding encircling only said second core means and operative to apply an auxiliary magnetomotive force to said second core means when either of said controlled rectifiers is conducting, said auxiliary magnetomotive force being of such direction as to oppose the magnetomotive force produced by current flowing in said primary winding; a load circuit connected in said system, said load circuit being energized when either of said controlled rectifiers is conducting; a triggering source operative to render each controlled rectifier conducting during alternate half cycles of the alternating voltage source by the application of a signal to the gate electrode of the proper controlled rectifier, said conducting being effective to allow current to flow through said primary winding and conducting controlled rectifier and to cause the voltage of said source to be impressed across said primary winding and to allow the discharge of said capacitor to a low voltage through said conducting controlled rectifier and secondary winding, energization of said primary winding causing a flux change occurring predominantly in said first core means until the flux level in the first core means reaches the saturable level herein called positive saturation, followed by a flux change occurring predominantly in said second core means, said last flux change serving to induce a voltage in said secondary winding, said last voltage appearing as a transient across said conducting controlled rectifier and having such polarity as to make the cathode of said conducting controlled rectifier momentarily positive with respect to the anode of said conducting controlled rectifier thereby interrupting the flow of forward current through said controlled rectifier and returning said controlled rectifier to the non-conducting state.

38. In an electrical system as claimed in claim 37 wherein said load circuit includes a load winding encircling both of said core means.

39. In an electrical system as claimed in claim 37 wherein said primary winding consists of a single winding whose turns encircle both of said magnetic core means.

40. In an electrical system as claimed in claim 37 wherein said primary winding consists of a pair of windings in series, with the turns of each member of the pair encircling only one of said core means.

41. In an electrical system as claimed in claim 37 in which said second saturable core means is of low remanence characteristic.

42. In an electrical system as claimed in claim 37 in which said second saturable core means is of square-loop characteristic.

No references cited.

JAMES W. MOFFITT, *Acting Primary Examiner.*

G. LIEBERSTEIN, *Assistant Examiner.*